Feb. 26, 1957 H. D. KRUG 2,782,462
METHOD OF PREHEATING OF VULCANIZING ARTICLES
OF RUBBER OR RUBBERLIKE MATERIAL
Filed July 13, 1953
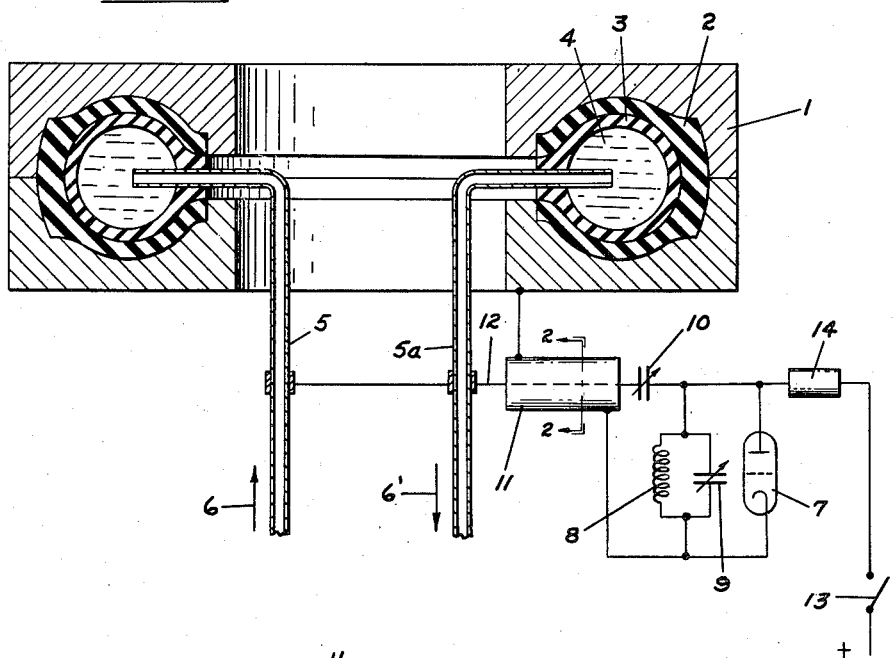
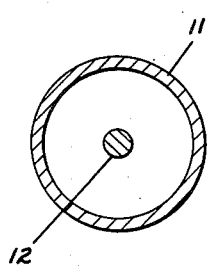
INVENTOR.
HANS DIETRICH KRUG
BY

United States Patent Office 2,782,462
Patented Feb. 26, 1957

2,782,462

METHOD OF PREHEATING OF VULCANIZING ARTICLES OF RUBBER OR RUBBERLIKE MATERIAL

Hans Dietrich Krug, Hannover, Germany, assignor to Continental Gummi-Werke Aktiengesellschaft, Hannover, Germany Application July 13, 1953, Serial No. 367,637

Claims priority, application Germany July 15, 1952

1 Claim. (Cl. 18—53)

The present invention relates to tires for vehicles and, more particularly, concerns a method of vulcanizing, preferably pre-heating, tires for vehicles or other articles of rubber and rubber-like materials in a high frequency electric condenser field while employing the wall of the vulcanizing mold as one of the two electrodes.

Methods of this general type are known according to which as second electrode a metallic conductor, for instance in form of wire inserts or a wire net, is employed which is embedded in the usually annular heating hose or curing bag. These known methods, however, have various drawbacks. Thus, for instance, the embedding of the said metallic electrodes in the curing bag causes certain difficulties and in addition to being relatively expensive, imports upon the curing bag an undesired stiffness. This is particularly inconvenient when the curing bag has to be removed from the vulcanized and thus stiff tire or the like, because the curing bag during its removal from the tire has to be bent sharply in order to get the curing bag out of the tire.

Furthermore, due to the fact that during the vulcanization of the curing bag a certain flowing of the bag material cannot be avoided, a precise predetermined position of the said metallic conductor in the curing bag cannot be secured.

When employing a wire net as inner or second electrode in conformity with certain heretofore known methods, a uniform electric alternating field cannot be obtained.

It is, therefore, an object of the present invention to provide an improved method of vulcanizing, preferably pre-heating, tires and other articles of rubber and rubber-like materials, which will overcome the above mentioned drawbacks.

It is another object of the present invention to provide an improved simplified method of making tires, which will avoid local overheating of the tire during the pre-heating or vulcanization thereof and will allow an easy insertion of the curing bag into and its removal from the article to be vulcanized or pre-heated.

It is a still further object of this invention to assure that the tire or other object to be vulcanized or pre-heated will be in proper contact with the respective electrodes during the vulcanization or pre-heating process to thereby obtain an increased degree of efficiency.

These and other objects and advantages of the invention will appear more clearly from the following specification in connection with the accompanying drawings, in which:

Figure 1 illustrates a setup for carrying out the method according to the invention;

Figure 2 is a section taken along the line II—II of Figure 1.

While with steam-vulcanization it is customary to apply simultaneously the inflation pressure and the heating medium, according to the present invention, when pre-heating or vulcanizing the tire or other rubber-like material by high frequency current, first the inflation pressure only is applied until the molding step of the tire or other article of rubber or rubberlike material has been substantially completed, in other words, until the tire or other article has been substantially pressed into all recesses in the mold. Only then, i. e. after this forming-in step, the high frequency energy will be applied. In conformity with the present invention, the inflating liquid employed for inflating the curing bag is employed as inner or second electrode, whereas the mold is in a manner known per se employed as outer or first electrode. The forming-in step normally requires a few minutes, whereas the preheating step proper, after switching on the high frequency energy, is completed in a shorter time. With the method according to the present invention, a practically completely uniform field is established between the inner and outer electrodes so that local overheating of the unfinished tire or other article of rubber or rubber-like material will be avoided. The method according to the preesnt invention is thus considerably simplified over heretofore known methods of the type involved and furthermore results in a better exploitation of the degree of efficiency of the generator, since the dielectric in the operating condenser, i. e. the tire or other article to be processed, is in close contact with the inner and outer electrodes.

Referring now to the drawings in detail, the setup shown therein by way of example for carrying out the method according to the invention comprises a tire mold 1 which may be of any desired design and construction. Arranged in said mold 1 is the unfinished tire 2 within which there is arranged the heating hose or curing bag 3. The heating hose or curing bag 3 is filled with an electrically conductive liquid filling 4 which serves as inner electrode. The outer electrode is formed by the electrically conductive tire mold 1. The liquid filling 4 is introduced into the heating hose or curing bag 3 by a pipe 5 in the direction of the arrow 6 and is discharged from said heating hose or curing bag through a tube or pipe 5a in the direction of the arrow 6'. The system is, of course, also provided with control valves arranged in the pipes 5 and 5a, however, for the sake of simplicity such valves have not been shown in the drawing.

The high frequency voltage required for the vulcanization or pre-heating step is furnished by an electronic generator. The tube 7 serves as generator. The oscillating circuit is formed by an inductivity or coil 8 in cooperation with a variable condenser 9. The variable condenser 10 serves for coupling purposes. The adapter element 11 is designed as coaxial conductor, the outer conductor of which is electrically connected with the cathode of tube 7 and with the tire mold 1. The inner conductor leads to the electrically conductive pipes 5 and 5a so that the inner conductor 12 is electrically connected with the electrically conductive liquid filling 4. The anode voltage is supplied to the electronic generator through a switch 13 and a filter chain or sifter 14.

After the curing bag 3 has been placed into the unfinished tire or article to be processed, the said tire or article together with the curing bag therein is placed into the mold 1. Thereupon, the tire mold 1 is closed, and the inflating pressure is applied by introducing the electrically conductive liquid into the heating hose or curing bag 3. Only then, after the forming-in step of the tire or article to be processed has been substantially completed, i. e. after the unfinished tire or article has entered into all individual depressions of the mold 1, the switch 13 will be closed so that now the high frequency voltage between the electrically conductive liquid filling 4 and the tire mold 1 will become effective.

It is, of course, understood that the present invention is, by no means, limited to the specific method described in connection with the setup shown by way of example in the drawing, but also comprises any modifications within the scope of the appended claim.

What I claim is:

A method of vulcanizing, preferably pre-heating vehicle tires and other hollow articles of rubber or rubber-like material in an electrically conductive mold in co-operation with a high frequency electric condenser field, which includes the steps of: placing an elastic curing bag into the article to be processed; placing the article to be processed with said curing bag therein into said mold; introducing electrically conductive liquid into said curing bag so as to cause the latter to press the article to be processed into complete and close contact with the mold, and only after close contact has been established between the article to be processed and the adjacent inner mold wall, applying high frequency electric energy to the article to be processed while using the mold as one electrode and using said liquid as another electrode.

References Cited in the file of this patent

UNITED STATES PATENTS

| | | |
|---|---|---|
| 2,438,952 | Te Grotenhuis | Apr. 6, 1948 |
| 2,441,699 | Gramelspacher | May 18, 1948 |
| 2,541,644 | Enabnit | Feb. 13, 1951 |